UNITED STATES PATENT OFFICE.

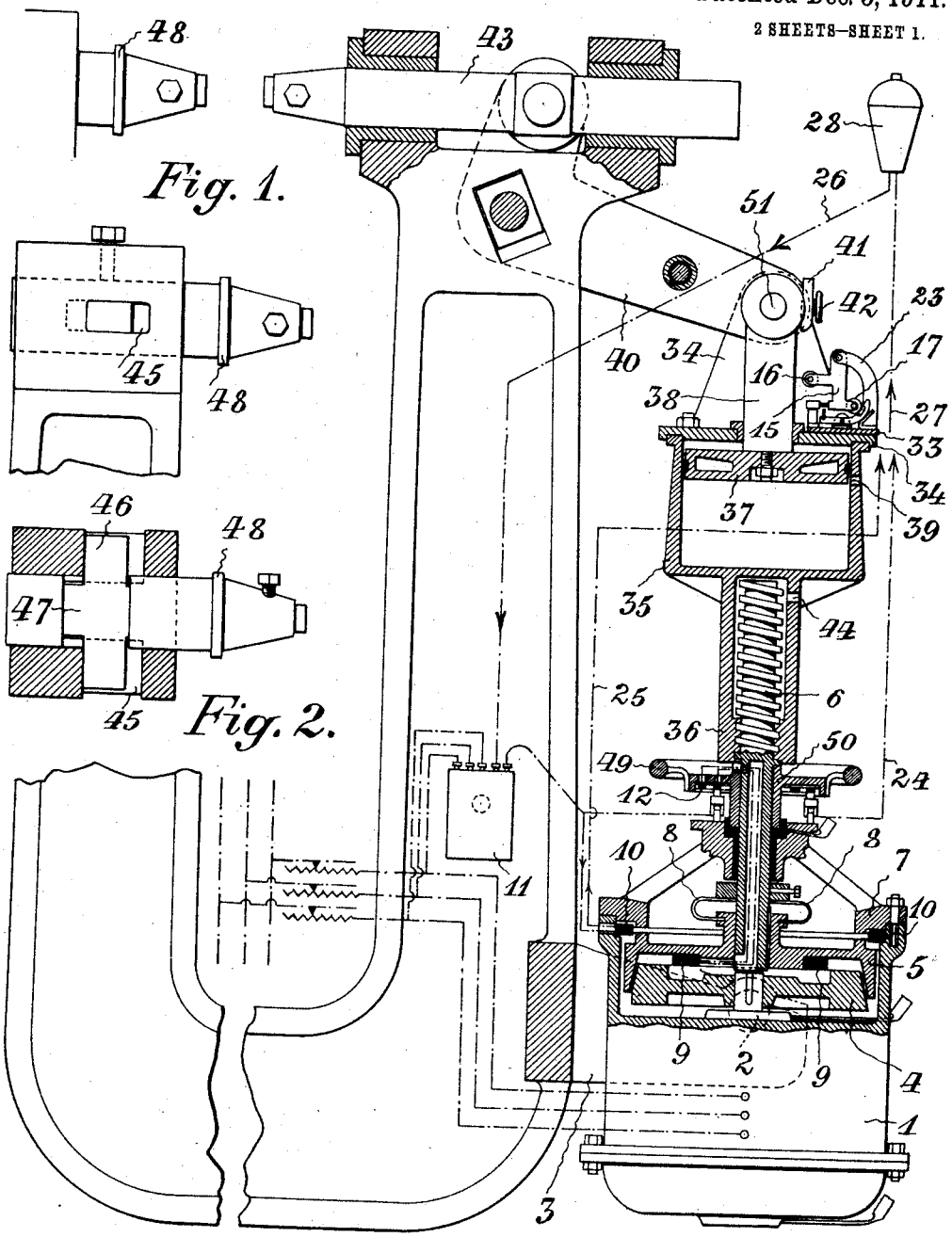

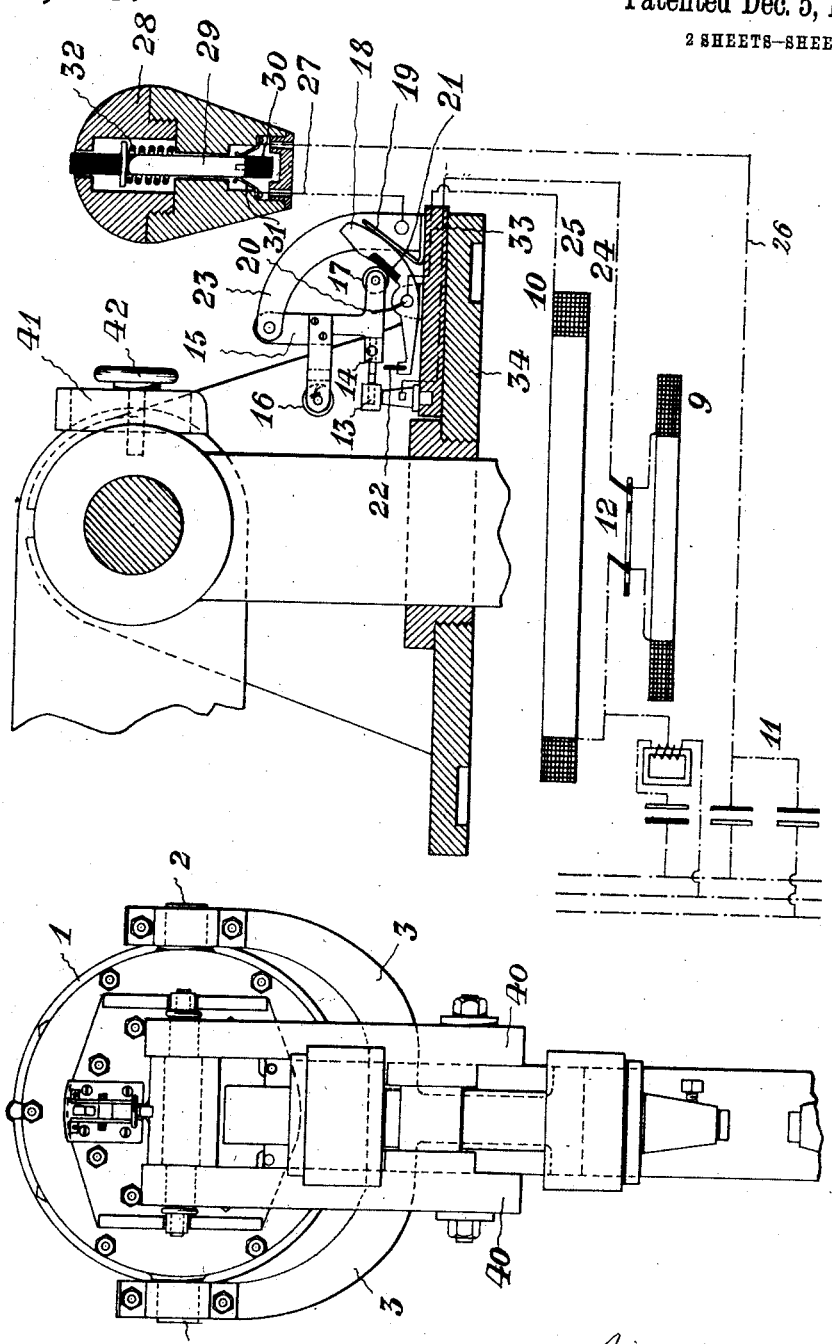

FRIEDRICH RITTER von MERKL, OF VIENNA, AUSTRIA-HUNGARY.

RIVETING-MACHINE.

1,010,938.  Specification of Letters Patent. Patented Dec. 5, 1911.

Application filed June 4, 1910. Serial No. 564,989.

*To all whom it may concern:*

Be it known that I, FRIEDRICH RITTER VON MERKL, doctor of engineering, a subject of the Austro-Hungarian Emperor, and residing at IV. Louisengasse 35, Vienna, Austria-Hungary, have invented certain new and useful Improvements in Riveting-Machines, of which the following is a specification.

This invention has for object a riveting machine, in which an elastic transmission device, preferably an air cushion is inserted between the die and the driving mechanism, and is compressed during the action of the machine thereby producing a gradually increasing pressure of the die upon the rivet, which pressure, after attaining the necessary value for riveting, depending upon the strength of the rivet, can be maintained constant for any desired period—that is, the required pressure can be maintained upon the level until the latter is cooled sufficiently to insure that the parts connected thereby can not separate. For this purpose an air cylinder and piston is inserted between the driving mechanism and the die, and one of the former parts is connected to the driving mechanism and the other to the die, whereby the relative displacement of cylinder and piston caused by the driving mechanism produces the downward movement of the die and simultaneously the compression of the air inclosed in the cylinder. A disengaging coupling is arranged between the driving mechanism and the air cushion for enabling the compression to be stopped at any desired pressure and that pressure to be maintained on the rivet as long as desired.

Figure 1 of the drawings illustrates one construction of riveting machine according to the present invention, and is a sectional elevation of an electrically driven machine. Figs. 2, 3, and 4, represent details of the said machine.

In the construction illustrated the driving motor 1, is suspended on trunnions 2, which are rotatably mounted in a fork 3 of the machine frame. A fly-wheel 4 is arranged on the motor shaft, which partially absorbs the fluctuations of loads and acts as the friction plate of a coupling whose second member 5 is mounted in an axially movable manner on a shaft consisting in a screw spindle 6. A coupling plate 7, rigidly fixed on the other side of the movable coupling disk 5, is adapted to stop the coupling disk 5 when it is disengaged from the fly-wheel, thereby preventing back turning of the screw spindle 6, which is not self stopping, and holding the die in its working position. The coupling disk 5 is under the control of springs 8 which retain it in mid position in which it is not in engagement with any of the coupling or friction disks. The nut 36 of the screw spindle 6, is connected to an air cylinder 35 which is prevented from rotation, and in consequence of the connection the cylinder is displaced axially when the screw is turned. The die 43 is connected to the piston 37 of the air cylinder, most conveniently by means of a bell-crank lever 40 having unequal arms, one arm of which is attached to the die and the second to the piston rod.

The engagement and disengagement of the coupling disk 5 may be effected electrically, for example, by means of exciting coils 9 and 10 as illustrated, which coils are arranged in the movable coupling disk 5 and in the fixed coupling plate 7. The current for the two exciting coils can be obtained directly from a shunt on the motor leads in the case of continuous current supply, and with alternating current either from a small D. C. generator driven from the motor shaft, or from a rectifier 11, which in the construction illustrated, is arranged in a cavity in the riveting machine frame and owing to its eccentric suspension remains in the vertical at every position of the machine. One of the current leads for the actuation of the coupling, divides into two branches leading to the coils 9 and 10 (Fig. 4) the current passing directly to the fixed coil 10 which presses the coupling disk 5 to the bearing cover forming the coupling plate 7, and over slip rings 12 and through the hollow screw spindle 6 to the coil 9 which pulls the coupling disk 5 into engagement with the fly-wheel. The two free ends 24 and 25 of the coil are led to an automatic current-interrupter which is fixed to, but insulated from the cover 34 of the air cylinder 35.

In the illustrated construction the interrupter consists in a bell crank lever 15 (Fig. 4) carrying rollers 16 and 17 of conducting material and a carbon contact 14. A second lever 18 pivoted on an axis 20, is arranged beneath the first one, and one arm of the lever 18 is constantly pressed against the roller 17 of the lever 15 by a spring 19 and possesses an inset 21 of insulating material near the pointed contact of the roller. This portion of the lever 18 is bent into a curve spiral with respect to the axis of the lever 15, which curve is continued in a circle having the said axis as center. By the foregoing arrangement it is effected that the second arm of the lever 18 carrying a plate 22 of insulating non-combustible material such as talc, or the like, will be moved rapidly at first and afterward imperceptibly, whenever the roller 17 is moved to the right. In this manner the talc plate 22 will be lifted up only sufficiently to break the arc between 13 and 14.

The axis of the bell crank lever 15 is journaled in a bracket 23, from which a lead 27 goes to a switch 28. In the construction illustrated the latter consists in a pear shaped body having two parts and formed of insulating material, in which body is mounted a conducting pin 29, axially movable and having an insulating sleeve 30 at its lower end which prevents the current from passing between the contact springs 31 of the switch when the pin is in the position at rest. The upper end of the pin 29 terminates in an insulating button, and on pressing the said pin into the pear shaped switch the conducting part of the pin 29 comes between the contact springs 31 and closes the circuit between the lead 27 and the switch 26. (Fig. 4.) In this position the coupling current flows over the slip rings 12 and through the exciting winding 9 as the circuit is closed only through the carbon contacts 13 and 14, the bell crank lever 15, its frame 23, the lead 27, and the switch 26. The coupling disk 5 is hereby pressed against the fly-wheel 4 (Fig. 1) and the screw spindle 6 displaces forward a nut 36 connected to the air cylinder 35. The piston 37 will not at first alter its position relative to the air cylinder, as the mass and friction of the bell crank lever 40, and the die 43 resist its forward motion. Only after the die has come into contact with the glowing rivet is the piston held fast and the opening 39 of the air cylinder closed by the continuing motion of the cylinder 35, whereupon quite a considerable volume of air is inclosed and compressed by the further working of the machine. As the relative position at any instant of the piston to the cylinder is a measure of the alteration in volume and consequently of the pressure of the inclosed air at the same instant, it is easy to alter the terminal pressure and to obtain any determined terminal pressure. For this purpose an adjustable striker, for example in the form of a plate 41, adjusted by a screw 42, may be fixed on the piston rod 38, which striker, when a predetermined pressure has been attained, comes into contact with a corresponding striker on the air cylinder, for instance with the roller 16 of the bell crank lever 15. The position in which the plate 41 must be adjusted relatively to the piston rod so as to produce a predetermined pressure in the cylinder when it strikes the roller 16, can be determined once for all either by calculation or experiment. The positions of the plate corresponding to various pressures may be marked on the same as a scale, while a fixed mark may be made on the piston rod. It will thus be rendered possible to adjust the plate before each riveting operation to give the pressure required for the particular diameter of rivet to be used. When the plate 41 comes in contact with the roller 16, the bell crank lever 15 is rotated to the right. The carbon contacts 13 and 14 are separated thus interrupting the current in the exciting coil 9, whereby the coupling disk 5 with the screw spindle 6 is disengaged from the fly-wheel. As the screw is not self-stopping, it would now turn backward owing to the action of the compressed air. To prevent this back turning, the coupling disk 5 is pressed against the fixed bearing cover 7 of the motor casing, which bearing cover is constructed in the form of a coupling plate or disk. This occurs automatically through the pressing down of the roller 16, whereupon the roller 17 leaves the insulating insert 21, and comes into conducting contact with the lever 18. In consequence of this the current cannot flow across the contacts 13 and 14, where the insulating non-combustible plate 22 has been thrust up and interrupted any possible arcing, but the said current must flow through the fixed exciting coil 10, the lead 25, the axis 20, the lever 18, the axis 15, and the lead 27 to the switch 28, thus pressing the coupling disk 5 against the bearing cover coupling plate and preventing the backward motion of the screw 6. The pressure in the pneumatic cylinder will consequently remain constant until the workman using the riveting machine releases the button of the switch 28, and thereby cuts off the current from the coil 10, so that the coupling is forced into mid-position between the coupling plate, and the bearing cover. Owing to the pressure in the pneumatic cylinder the backward turning of the screw 6 will now proceed until the piston reaches the hole 39, at which instant the die only lies loosely upon the prepared rivet head. The momentum of the coupling disk 5 causes a further backward turning of the screw 6, whereby the die is forced down from the rivet head into its limiting position. All shock during the operation is prevented by the air cushion. After passing the hole 39 the piston compresses a small volume of air between itself and the cylinder cover 34, which absorbs the shock. The plate 41 leaves the roller 16 during this back motion of the die, causing the carbon contacts 13 and 14 to touch again and be in position for the next operation, in which the current has to flow through the coil 9. No carbon contact is required between the roller 17, and the lever 18 (Fig. 4), since the current through the switch 28 is interrupted before the roller 17 passes through the insulating inset 21.

The tube constituting the nut 36 for the spindle 6 is cast with the air cylinder and acts along with the large upper surface of the cylinder as a cooling device as the screw 6 moves up and down in the tube like a piston sucks in air and ejects it when warmed through the port 44. The heating of the air cylinder cannot moreover become considerable, because expansion takes place in the cylinder immediately after compression.

In the herein described machine the thickness of the plates to be riveted is immaterial, as the compression, as well as the work given out by the flywheel and the motor, begins only when the die meets the rivet head. During the formation of the head the pressure on the rivet gradually increases, so that a good filling up of the rivet holes is accomplished. In order, however, to make as small as possible the no-load period from the limiting position of the die to the rivet shank, when a number of materials of different thicknesses are being riveted together, the fixed die opposite the moving die can be adjusted to three positions. For this purpose equal sized recesses 45 are made in the arm of the machine frame and in the die, in which the cross piece 46 can be inserted, either (as illustrated) with the projection 47 downward, or with it upward. By removing the cross piece the die can be inserted with the collar 48 hard up against the frame. The sleeve 50 carrying the slip rings 12 (Fig. 1) and connected to the screw spindle 6, may conveniently be provided with a small hand wheel 49 for the purpose of bringing the rivet die 43 into a determined position in the event of a break-down of the motor.

What I claim as my invention and desire to secure by Letters Patent is—

1. In a machine of the character described, the combination of a movable die, a driver, and means connecting the die and the driver and including an elastic power transmission device adapted to cause the die to act with gradually increasing pressure.

2. In a machine of the character described, the combination of a movable die, a driver, means connecting the die and driver and including an elastic power transmission device adapted to cause the die to act with gradually increasing pressure, and means whereby the maximum pressure exerted by the die can be varied.

3. In a machine of the character described, the combination of a movable die, a driver, and means connecting the die and driver and including an elastic power transmission device comprising a relatively movable piston and cylinder, the latter containing a compressible medium, whereby it is caused to act with gradually increasing pressure.

4. In a machine of the character described, the combination of a movable die, a driver, means for transmitting power from the driver to the die including an elastic member adapted to cause the die to act with gradually increasing pressure, and means for maintaining the maximum pressure exerted by the die constant as long as desired.

5. In a machine of the character described, the combination of a movable die, a driver, means for transmitting power from the driver to the die adapted to cause the die to act with gradually increasing pressure, means for varying the maximum pressure exerted by the die, and means for maintaining constant any such maximum pressure.

6. In a machine of the character described, the combination of a movable die, a driver, power transmitting connections between the die and driver including a relatively movable pressure fluid cylinder and piston, means for varying the extent to which fluid can be compressed in said cylinder, and means for maintaining the parts in the positions occupied when the fluid has been compressed to the desired extent.

7. In a machine of the character described, the combination of a movable die, a rotary driver, means for transmitting power from the driver to the die including a pressure fluid cylinder and piston one connected with the die and the other with a member adapted to be clutched to the driver, means for automatically disconnecting the driver when said cylinder and piston have been relatively moved sufficiently to cause the die to exert the desired pressure, and means for holding the cylinder and piston in such position when the driver is disconnected.

8. In a machine of the character described, the combination of a movable die, a driver, power transmitting devices between the driver and die including a relatively movable pressure fluid cylinder and piston, a magnetic clutch for connecting the driver with the power transmitting devices, means for automatically disengaging the driver from said devices upon the completion of the desired relative movement of said cylinder and piston, and means for retaining the cylinder and piston in said adjusted position.

9. In a machine of the character described, the combination of a movable die, a driver, power transmitting devices between the driver and die including a relatively movable pressure fluid cylinder and piston, a magnetic clutch for connecting the driver with the power transmitting devices, means for automatically disengaging the driver from said devices upon the completion of the desired relative movement of said cylinder and piston, a second magnetic clutch adapted to be energized when the driver is disconnected and to retain the cylinder and piston in their adjusted positions, and a single electric switch controlling both said clutches.

10. In a machine of the character described, the combination of a movable die, a driver, power transmitting devices between the driver and die including a relatively movable pressure fluid cylinder and piston, a magnetic clutch for connecting the driver with the power transmitting devices, an electric circuit including said clutch, a second clutch adapted to retain the cylinder and piston in any adjusted position, an electric circuit controlling said second clutch, means adapted to be actuated by the movable member of the fluid pressure devices to open the first and close the second said circuit, and a switch controlling both said circuits.

11. In a machine of the character described, the combination of a movable die, a driver, a feed screw, fluid pressure power transmitting devices comprising a cylinder and piston one connected with the die and the other engaging the feed screw, means for connecting the feed screw and driver at will, means for automatically disconnecting the feed screw and driver when the cylinder and piston have been adjusted to a predetermined extent, and means for preventing retrograde movement of the feed screw when the driver is disconnected therefrom.

12. In a machine of the character described, the combination of a movable die, a driver, power transmitting devices between the driver and die including a piston connected with the die and a pressure fluid cylinder into which the piston extends, a clutch adapted to connect said cylinder with the driver to cause the latter to move the cylinder relative to the piston, an electro-magnet for actuating said clutch, a second electro-magnet adapted to hold the cylinder stationary in any adjusted position, and a switch included in the circuits of both said magnets and adapted to be actuated at the termination of a predetermined movement of the cylinder.

13. In a machine of the character described, the combination of a die, a driver, a feed screw, a fluid cylinder having at one side a sleeve engaging said screw, a piston in the cylinder and connected with the die, a clutch adapted to connect the feed screw and driver, an electro-magnet for actuating said clutch, a pair of separable contacts mounted to move with the cylinder, an electric circuit including said magnet and contacts, an adjustable device in the path of and adapted to separate said contacts, and means for preventing backward movement of the cylinder when the feed screw and driver are disconnected.

14. In a machine of the character described, the combination of a die, a driver, a feed screw, a fluid cylinder having at one side a sleeve engaging said screw, a piston in the cylinder and connected with the die, a clutch adapted to connect the feed screw and driver, an electro-magnet for actuating said clutch, a pair of separable contacts mounted to move with the cylinder, an electric circuit including said magnet and contacts, an adjustable device in the path of and adapted to separate said contacts, a second electro-magnet adapted to prevent relative movement of the cylinder and piston when the driver and feed screw are disconnected, and a switch controlling both magnets.

In testimony whereof I have signed my name to this specification in the presence of two subscribing witnesses.

FRIEDRICH RITTER von MERKL.

Witnesses:
ADOLF URBANTSCHITSCH,
WENZEL SINKE.

---

Copies of this patent may be obtained for five cents each, by addressing the "Commissioner of Patents, Washington, D. C."